(12) United States Patent
Tanaka et al.

(10) Patent No.: US 6,726,356 B2
(45) Date of Patent: Apr. 27, 2004

(54) CALORIMETER

(75) Inventors: Keiichi Tanaka, Chiba (JP); Toshimitsu Morooka, Chiba (JP)

(73) Assignee: SII NanoTechnology Inc.,, Chiba (JP)

( * ) Notice: Subject to any disclaimer, the term of this patent is extended or adjusted under 35 U.S.C. 154(b) by 0 days.

(21) Appl. No.: 10/158,350

(22) Filed: May 30, 2002

(65) Prior Publication Data

US 2003/0043879 A1 Mar. 6, 2003

(30) Foreign Application Priority Data

May 31, 2001 (JP) ........................................ 2001-165313

(51) Int. Cl.[7] .............................................. G01K 17/00

(52) U.S. Cl. .............................. 374/31; 374/32; 374/10

(58) Field of Search ................................ 374/10, 31, 32, 374/41, 42, 121; 250/338.1, 338.4, 332

(56) References Cited

U.S. PATENT DOCUMENTS

| 5,634,718 | A | * | 6/1997 | Martinis et al. | ............... 374/32 |
| 5,641,961 | A | * | 6/1997 | Irwin et al. | ............... 250/336.2 |
| 5,880,467 | A | * | 3/1999 | Martinis et al. | ............ 250/310 |
| 5,880,468 | A | * | 3/1999 | Irwin et al. | ............... 250/336.2 |
| 6,239,431 | B1 | * | 5/2001 | Hilton et al. | ............ 250/336.2 |
| 6,455,849 | B1 | * | 9/2002 | Hilton et al. | ............ 250/336.2 |

* cited by examiner

Primary Examiner—Diego Gutierrez
Assistant Examiner—Lydia M. DeJesus
(74) Attorney, Agent, or Firm—Adams & Wilks

(57) ABSTRACT

The present invention is intended to provide a calorimeter for converting a quite small amount of heat into an electrical signal, especially a radiation detector providing improved energy resolution and count rate, by using a superconducting transition edge. The calorimeter has an absorber for absorbing radiation and producing heat. This absorber is formed on a resistor whose resistance value is varied by the heat. The resistor is formed on a membrane that controls escape of the heat. The calorimeter is characterized in that it is further fitted with a heat dissipation device for letting active electrons produced in the calorimeter escape to the outside.

10 Claims, 4 Drawing Sheets

CALORIMETER

BACKGROUND OF THE INVENTION

This invention relates to a calorimeter for converting a very small amount of heat into an electrical signal and, more particularly, to a radiation detector that provides improved energy resolution and count rate by the use of a superconducting transition edge.

A calorimeter is an instrument for converting externally applied heat into an electrical signal such as current or voltage. Attempts have been made as one example of its application to detect the energy of radiation as a quite small amount of heat. A piece of literature on this is described, for example, by S. H. Moseley et al. in *Journal of Applied Physics*, 56, 1275 (1984). A calorimeter has a membrane for controlling the flow rate of heat. An absorber (semiconductor) and a thermometer (semiconductor) are mounted on the membrane. The absorber absorbs heat, while the thermometer converts the heat generated by the absorber into an electrical signal. The calorimeter that detects radiation has a quantization efficiency close to 100%. That is, nearly 100% of the energy of radiation is converted into an electrical signal and so there is the advantage that the efficiency is high (i.e., no waste results). Because of this superiority, the calorimeter is adapted as a radiation detector. The energy resolution of a calorimeter is dominated by phonon noise in devices. The effects of the noise can be reduced by using cryogenic temperatures (e.g., below 1 K). In this way, attempts have been made to enhance the energy resolution.

The response speed (i.e., the time between the instant when radiation enters the calorimeter to thereby produce pulses and the instant when the original stable state is regained) of pulses produced by radiation is given by C/G where C is the heat capacity of the calorimeter and G is the thermal conductance of the membrane to dissipate heat to the outside. This conductance indicates the time in which the heat produced by the calorimeter is transmitted through the membrane and escapes.

In 1995, a superconducting calorimeter (hereinafter referred to as a "TES (transition-edge sensor") was reported in which self-feedback function is given at the superconducting transition edge to thereby provide higher energy resolution and higher count rate than the prior art calorimeter (K. D. Irwin, *Applied Physics Letters*, 66, 1998 (1995)).

With respect to superconductivity, a transition is made from normal conduction to superconductivity at transition temperatures, as shown in FIG. 5. This range of temperatures at which the transition is made is referred to as the superconducting transition edge. The superconducting transition edge is characterized in that a greater amount of change in the resistance occurs for a given amount of temperature change. When heat enters from the outside, the TES produces a quite small change in the temperature. As a result, a greater change in resistance is obtained. When the TEM is driven at a constant voltage at the superconducting transition edge, radiation is absorbed, accompanying a change in the resistance value of the TES. An electrical current corresponding to the change in the resistance is produced. A 1-to-1 relationship exists between the energy of radiation and the peak value of the signal current. The energy of radiation impinging on the TES can be detected by reading the peak value. The self-feedback function permits heat generated inside the TES (active electrons) to escape more quickly than conventional. Higher speed operation of the calorimeter is enabled. Furthermore, the self-feedback function reduces noise and achieves higher energy resolution. Another feature is that the material of the TES can be made entirely from a metal or metals. As a result, the thermal capacity and the electron diffusion time can be reduced. In examples reported heretofore, 200 to 300 $\mu$s are reported in the case of an energy resolution of 4.5 eV.

The TES is a calorimeter which makes use of a superconducting transition edge and to which a self-feedback function is given. The TES achieves higher energies and higher speeds compared with calorimeters using semiconductors. It has been difficult to set the fall times of pulses produced in the TES due to radiation to less than 100 $\mu$s for the following reason.

The energy resolution of a calorimeter is determined by the variation in the peak values of pulses. Before the temperature in the TES is uniformly elevated by active electrons produced by X-rays, the active electrons are diffused to the outside of the TES. The variation in the peak values increases, thus deteriorating the energy resolution. The process step in which the active electrons uniformly elevate the temperature inside the TES is related to the rise time of pulses. The process step in which the active electrons diffuse out of the TES is related to the fall time. Therefore, in order to improve the energy resolution, the time ($\tau_0$=C/G) in which active electrons are transmitted through the membrane and escape must be prolonged compared with the rise time of pulses. In this equation, C indicates the heat capacity of the calorimeter and G indicates the thermal conductance of the membrane. Where the rise time is set to 1 $\mu$s, for example, it is better to set the $\tau_0$ to equal to or greater than 1 ms. To improve the count rate, it is necessary to let active electrons escape to the outside as quickly as possible for regaining the original steady state after the calorimeter is elevated in temperature uniformly. That is, it is necessary to shorten the pulse fall time. The count rate is the inverse of 4 times the pulse time constant and indicates the number of pulses capable of being counted per second. Where one wants to improve the energy resolution, a multiple greater than 4 times may be selected.

A calorimeter having a superconducting transition edge has succeeded in shortening the pulse time constant to $\tau=\tau_0/(1+A)$ (where A is the feedback constant) by imparting a self-feedback function to the prior art calorimeter. The great advantage of this method over a calorimeter using a semiconductor is that the time in which electrons are caused to escape to the outside by self-feedback after temperature elevation is improved, though the time in which heat is transmitted through the membrane and dissipates is longer compared with the pulse rise time.

From these considerations, it is important to: (1) set the time in which heat is transmitted through the membrane and escapes to be a sufficiently large value compared with the electron diffusion time; and (2) to let electrons inside the calorimeter escape to the outside as quickly as possible after temperature elevation, in order to shorten the pulse time constant of the calorimeter.

A calorimeter using a superconducting transition edge has the problem that if the energy resolution is set to less than 10 eV, the feedback constant A becomes less than 100. Consequently, it has been difficult to set the pulse time constant to less than 100.

SUMMARY OF THE INVENTION

A calorimeter of the present invention using a superconducting transition edge and having an absorber for absorbing radiation and producing heat, the absorber being formed on a resistor whose resistance value is varied by the heat. The resistor is formed on a membrane for controlling escape of the heat. The calorimeter is characterized in that it is equipped with a device for letting active electrons produced in the calorimeter escape to the outside.

As a result, if the time (C/G) in which heat produced by the absorber is transmitted through the membrane as phonons and allowed to escape is set long to improve the energy resolution, active electrons inside the TES can be forced to the outside of the calorimeter. Therefore, the pulse time constant can be shortened. In consequence, higher-speed operation of the calorimeter can be realized. Furthermore, the time constant (C/G) can be set sufficiently greater than the time in which active electrons produced by the absorber are diffused inside the calorimeter. Hence, variations in the pulse peak values can be suppressed. Higher energy resolution can be accomplished.

The invention also provides a calorimeter characterized in that the device for letting active electrons escape to the outside is an SIN junction device comprising a three-layer structure consisting of parts of the absorber, a thin insulating film, and a superconductor.

Where the absorber is a normal conductor, the three-layer structure consisting of the absorber, thin insulating film, and superconductor is known as an SIN (Superconductor-Insulator-Normal metal) junction. If this structure is used, the response occurring on application of a voltage can be set to 1 $\mu$s. Active electrons produced by the absorber can be quickly sent from the absorber to the superconductor as an electrical current. As a result, a device can be fabricated in which the amount of electric charge flowing from the absorber to the superconductor can be adjusted by applying a voltage between the absorber and the superconductor. A calorimeter capable of providing quick response can be obtained.

In addition, the invention provides a calorimeter which makes use of a superconducting transition edge and in which an absorber for absorbing radiation and producing heat is formed on a resistor whose resistance value is varied by the heat. The resistor is formed on a membrane that controls escape of the heat. This calorimeter is characterized in that it is fitted with a thermal conductance adjuster for adjusting the thermal conductance of the membrane.

To improve the response speed of the calorimeter, it is better to increase the thermal conductance, because the response speed is equal to the calorimeter's heat capacity divided by the thermal conductance (C/G). However, it is necessary to make uniform the thermalization of the calorimeter in order to improve the energy resolution and so it is better to reduce the thermal conductance. In the present invention, the thermal conductance adjuster is provided which reduces the thermal conductance during the process in which the calorimeter is thermalized owing to absorption of radiation and increases the thermal conductance during the process in which active electrons produced as a result of thermalization are quickly released to the outside. As a consequence, variations in the peak values of the calorimeter can be reduced by reducing the thermal conductance at first. A calorimeter having a higher energy resolution can be accomplished. Furthermore, the steady state prior to radiation absorption can be regained by quickly releasing electrons produced by thermalization to the outside. Hence, faster response and higher count rate can be accomplished. Especially, in order to adjust the thermal conductance, it is necessary to adjust the flow rate of heat from the calorimeter to the outside. Where a resistor is used as the thermal conductance adjuster and the temperature of the membrane is elevated by resistive heating, the temperature gradient between the calorimeter and the ambient can be reduced. For this reason, the flow rate of heat from the calorimeter to the outside decreases. The temperature gradient increases if the resistive heating is stopped. The flow rate of heat from the calorimeter to the outside increases. As a result, if a resistor is employed as the thermal conductance adjuster, the thermal flow rate can be adjusted easily. It is possible to return the apparatus to the steady state prior to radiation absorption by quickly releasing electrons produced by thermalization to the outside. Higher-speed response and higher count rate can be accomplished.

DETAILED DESCRIPTION OF THE INVENTION

Embodiment 1

Figure 1A:
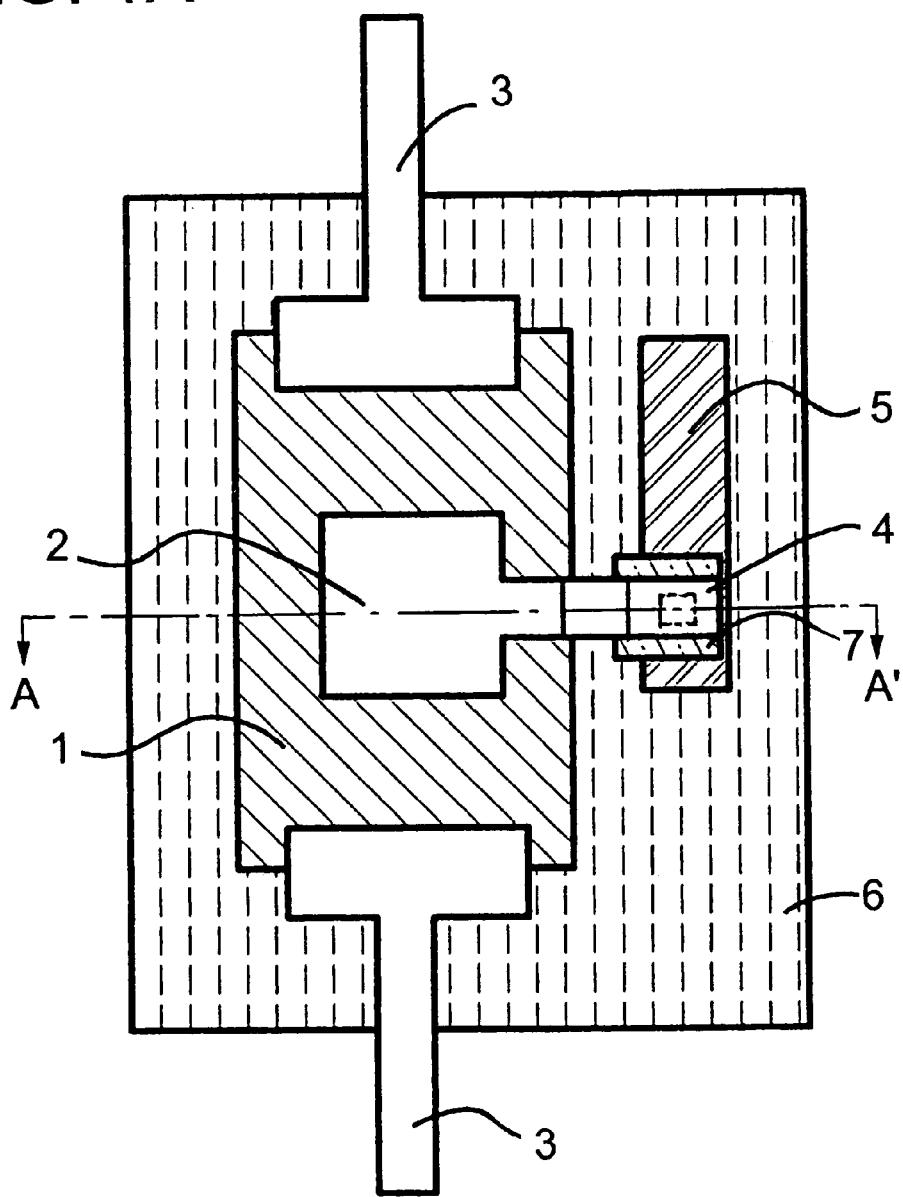
FIG. 1 is a schematic view showing a calorimeter according to Embodiment 1 of the present invention.
Figure 1B:
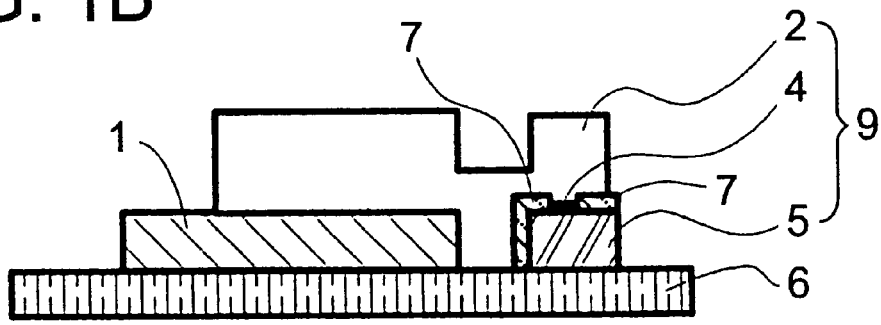

FIG. 1A is a schematic view of a calorimeter using a superconducting transition edge. The calorimeter has an absorber for absorbing radiation and producing heat. The absorber is formed on a resistor whose resistance value is varied by the heat. The resistor is formed on a membrane that controls escape of the heat. In this calorimeter, a junction is placed parallel with the resistor. In the junction, a superconductor different from the resistor and a thin insulator film are sandwiched between parts of the absorber. FIG. 1B is a cross-sectional view taken on line A–A' of FIG. 1A.

In the present calorimeter, the resistor 1 and the superconductor 5 are formed on the membrane 6. The absorber 2 is formed on the resistor 1. The absorber 2 is also formed over the superconductor 5 via an insulator film 4. Superconducting wires 3 are attached to the resistor 1.

Either a monolayer of a superconductor or a bilayer of a superconductor and a normal conductor can be used as the resistor 1. Where the bilayer is used, any arbitrary superconductivity transition temperature can be set by varying the thickness ratio between the superconductor and the normal conductor. For example, gold and titanium can be used as the normal conductor and superconductor, respectively. A thin titanium film having a thickness of 100 nm has a superconductivity transition temperature of about 0.6 K. The superconductivity transition temperature can be shifted to 0.4 to 0.5 K by laminating gold to a thickness of tens of nanometers. The superconducting wires 3 and the superconductor 5 can be made from niobium, for example. The insulator film 4 needs to be thin enough that an electrical current tunnels from the absorber 2 to the superconductor 5. The film thickness should be set to orders of nanometers. The thickness of an insulator film 7 is so set that no current tunnels from the absorber 2 to the superconductor 5. Accordingly, the area of the tunneling current flowing from the absorber 2 to the superconductor 5 is the area of the insulator film 4. The insulator film 4 is sandwiched between the absorber 2 that is a normal conductor and the superconductor 5. That is, a three-layer structure is formed and known as an SIN (Superconductor-Insulator-Normal metal) junction 9.

When radiation is detected, the resistor 1 is in a constant-voltage state. A thermal balance is maintained between joule heat generated by the resistor 1 and heat that is transmitted through the membrane 6 and dissipated to an external heat reservoir. This thermal balance is so set that the temperature of the resistor 1 is close to the superconductivity transition temperature. The following relationship holds:

$$\frac{V_0^2}{R} = G(T_c - T_b) \tag{1}$$

where $V_0$ is the value of the constant voltage, R is the value of the resistance of the resistor 1, $T_c$ is the superconductivity transition temperature of the resistor, $T_b$ is the temperature of the heat reservoir, and G is the thermal conductance of the membrane 6.

A literature regarding a method of driving a calorimeter is described, for example, by K. D. Irwin in *Applied Physics Letters*, 66, 1998 (1995). It is assumed that when the resistor 1 is generating heat, the absorber 2 is at a potential of $V_1$. A voltage is supplied from an external power supply such that the superconductor 5 is also at the potential of $V_1$. At this time, the absorber 2 and the superconductor 5 are at equipotential. Therefore, no tunneling current flows. The energy of free electrons flowing through the resistor 1 is given by $k_B T_c$, where $k_B$ indicates the Boltzmann constant. Where the superconductivity transition temperature is 0.4 K, $k_B T_c$= 0.035 meV, which is sufficiently smaller than the energy gap Δ=0.3 meV of niobium. Therefore, electrical current due to thermal fluctuations can be almost neglected.

When radiation is absorbed into the absorber 2, active electrons are produced. Where the absorber 2 is a metal, the energy of the radiation is converted into the energy of the active electrons. The active electrons diffuse into the absorber 2 and into the resistor 1, thus elevating the temperature of the resistor 1. Let $E_{in}$ be the energy of incident radiation. Let $g(E_f)$ be the state density near the Fermi level. Let V be the volume of the calorimeter. At temperature T, the number of electrons N per unit volume is given by $$N = \int_0^{E_F(T)} g(E) dE + \frac{\pi^2}{6}(kT)^2 g'(E_F) \tag{2}$$

where g(E) indicates the state density and k indicates the Boltzmann constant. $E_F$ indicates the Fermi energy at temperature T and is given by $$E_F(T) = E_F(0) \left| 1 - \frac{\pi^2}{12}\left(\frac{kT}{E_F(0)}\right)^2 \right| \tag{3}$$

$E_F(0)$ indicates the Fermi energy level at temperature 0 K. When the temperature changes from T to T+ΔT, electrons at levels lower than the Fermi level are activated. Eq. (1) is expressed by $$N = \int_0^{E_F(T+\Delta T)} g(E) dE + \frac{\pi^2}{6} k^2 (T + \Delta T)^2 g'(E_F(T + \Delta T)) \tag{4}$$

If ΔT is sufficiently smaller than T, and if the energy derivative of the state density hardly varies when the temperature rises, the number of electrons ΔN activated by radiation is given by $$\Delta N = \int_{E_F(T)}^{E_F(T+\Delta T)} g(E) dE = \frac{\pi^2}{3} k^2 T \Delta T g'(E_F) \tag{5}$$

The energy derivative of the state density is given by $$g'(E) = \frac{1}{4\pi^2}\left(\frac{2m}{\eta^2}\right)^{3/2} E_F^{-1/2} \tag{6}$$

From Eqs. (4) and (5), ΔN can be rewritten into the form $$\Delta N = \frac{k^2 VT}{12}\left(\frac{2m}{\eta^2}\right)^{3/2} E_F^{-1/2} \Delta T \tag{7}$$

where V is the volume of the metal. Substituting the electronic specific heat $C_e$ per unit volume into Eq. (7) gives rise to $$\Delta N = \frac{C_e}{4E_F} \Delta T = \frac{E_{in}}{4VE_F} \tag{8}$$

The amount of increase of electrons is given by Eq. (7). For example, where the operating temperature of the calorimeter is 0.4 K, the second term of the left-hand side of Eq. (2) can be neglected. The Fermi level remains the same as the Fermi level at 0 K. In the case of gold, the Fermi level is about 5.51 eV. Where incident energy $E_{in}$ of 5.9 keV impinges on a gold absorber measuring 500 μm in length×500 μm in width and 300 nm in height, 3.6×10$^{15}$ active electrons are produced.

Figure 2:
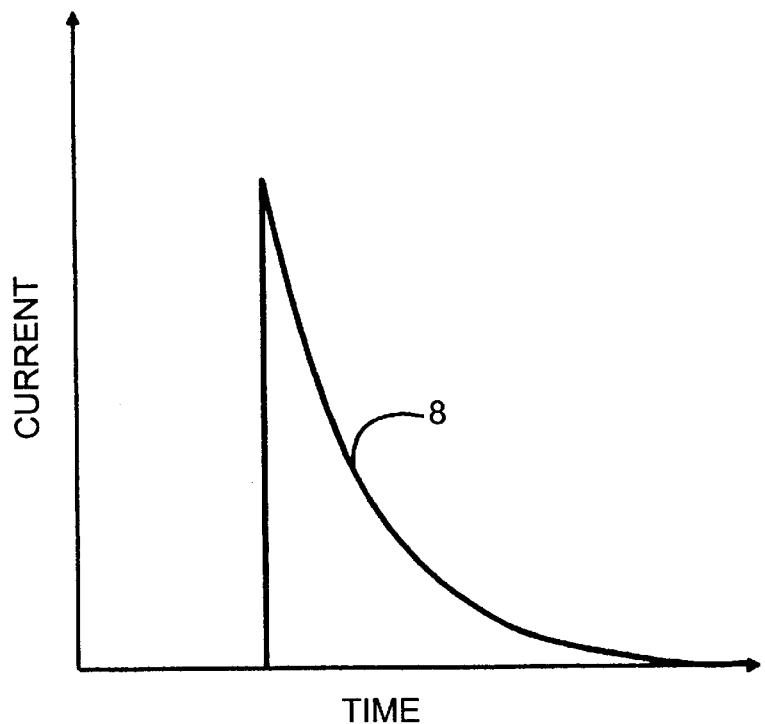
FIG. 2 is a schematic graph showing the current-time characteristics of the calorimeter according to Embodiment 1 of the invention.

X-ray pulses 8 shown in FIG. 2 indicate variations in the current flowing through the calorimeter, the variations being caused by absorption of radiation. The variations in the current are detected by a SQUID (superconducting quantum interference device). After detecting the peak value of the pulses 8, a voltage comparable to the energy gap of the superconductor 5 is applied to it. The amount of charge Q tunneling from the absorber 2 to the superconductor 5 is given by $$Q = \int (1/2eR_N)(2\pi \Delta k_B T)^{1/2} \exp\left[\frac{-(\Delta - eV)}{k_B T}\right] dt \tag{9}$$

where $R_N$ indicates the resistance value of the SIN junction 6 in a normal conduction state and e indicates the amount of electric charge. Where the applied voltage is fixed, the time Δt in which active electrons (Q=Ne) tunnel from the absorber 2 to the superconductor 5 is given by $$\Delta t = \frac{2N_e^2 R_N}{(2\pi \Delta k_B T)^{1/2} \exp\left[\frac{-(\Delta - eV)}{k_B T}\right]} \tag{10}$$

Figure 3:
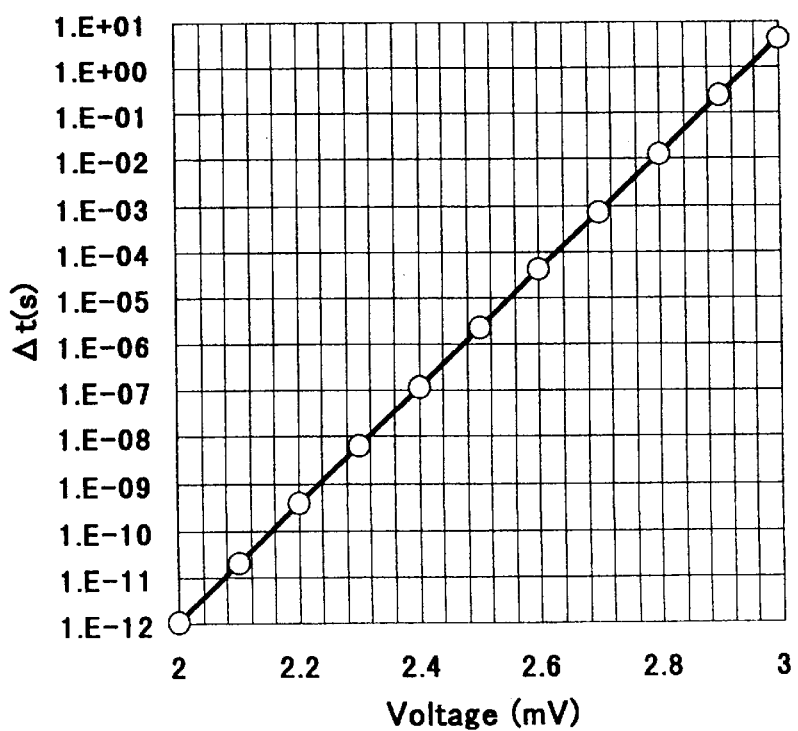
FIG. 3 is a schematic diagram of X-ray pulses in the calorimeter according to Embodiment 1 of the invention.

The relation between Δt and the voltage is shown in FIG. 3. For instance, if it is assumed that $R_N$=3Ω·T=0.4K·Δ=3 meV·V=2.5 mV·N=3.6×10$^{15}$, then Δt=2.2 μs. That is, active electrons are allowed to escape via the SIN junction 9 by applying a voltage of 2.5 mV to the superconductor 5 for 2.2 μs, the junction being already applied with voltage $V_1$. As a result, the time constant of pulses can be shortened. In the case of the prior art calorimeter, the time taken to let active electrons escape to the outside was more than 100 μs. Where the present invention is exploited, the time can be shortened to orders of microseconds. Furthermore, Δt can be increased and reduced by adjusting the applied voltage V. In this way, a time constant corresponding to the need can be obtained. Consequently, a device can be built which is capable of adjusting the amount of charge flowing from the absorber to the superconductor by applying a voltage between the absorber and the superconductor. Thus, a calorimeter capable of providing quick response can be obtained.

Embodiment 2

Figure 4:
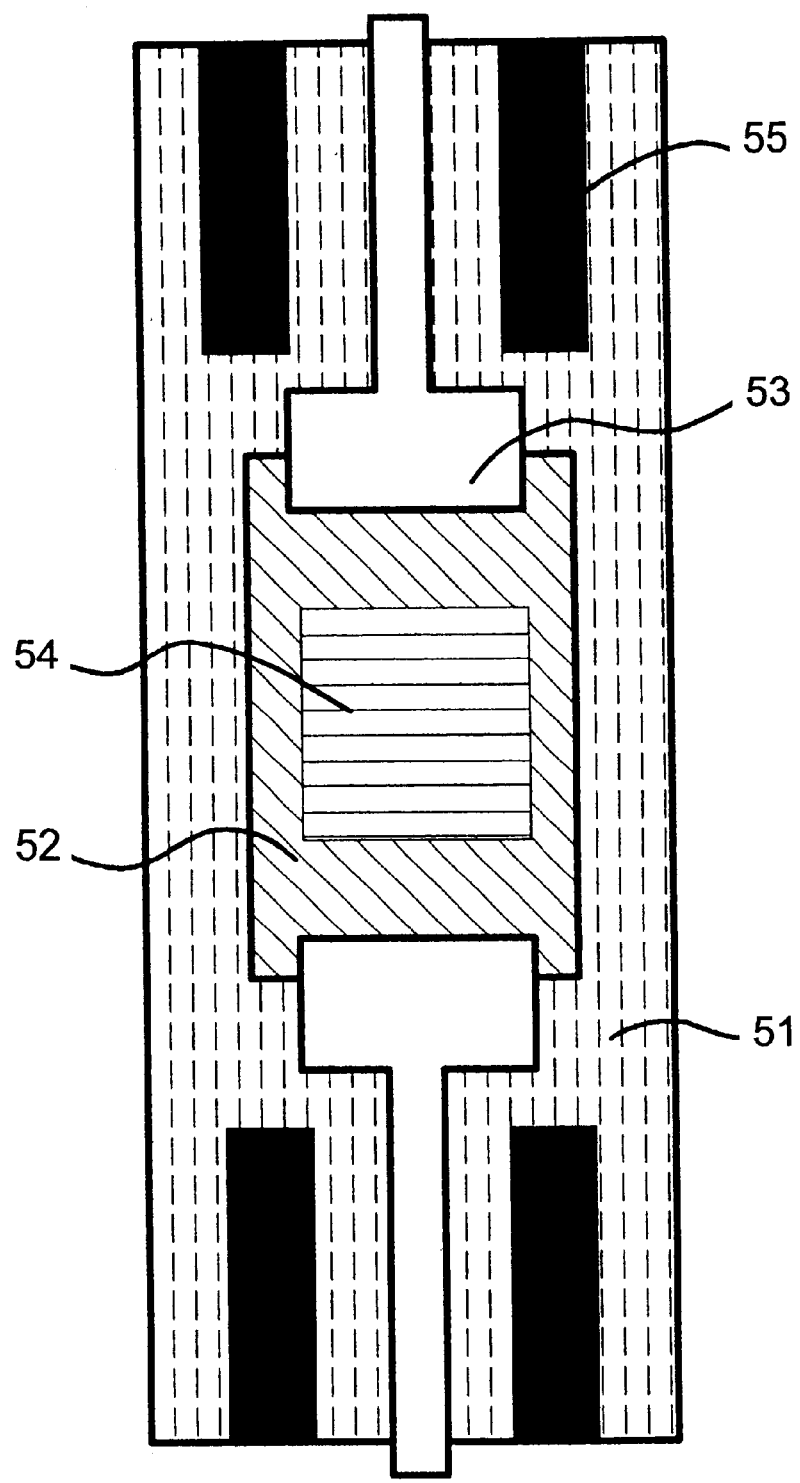
FIG. 4 is a schematic view showing a calorimeter according to Embodiment 2 of the invention.
Figure 5:
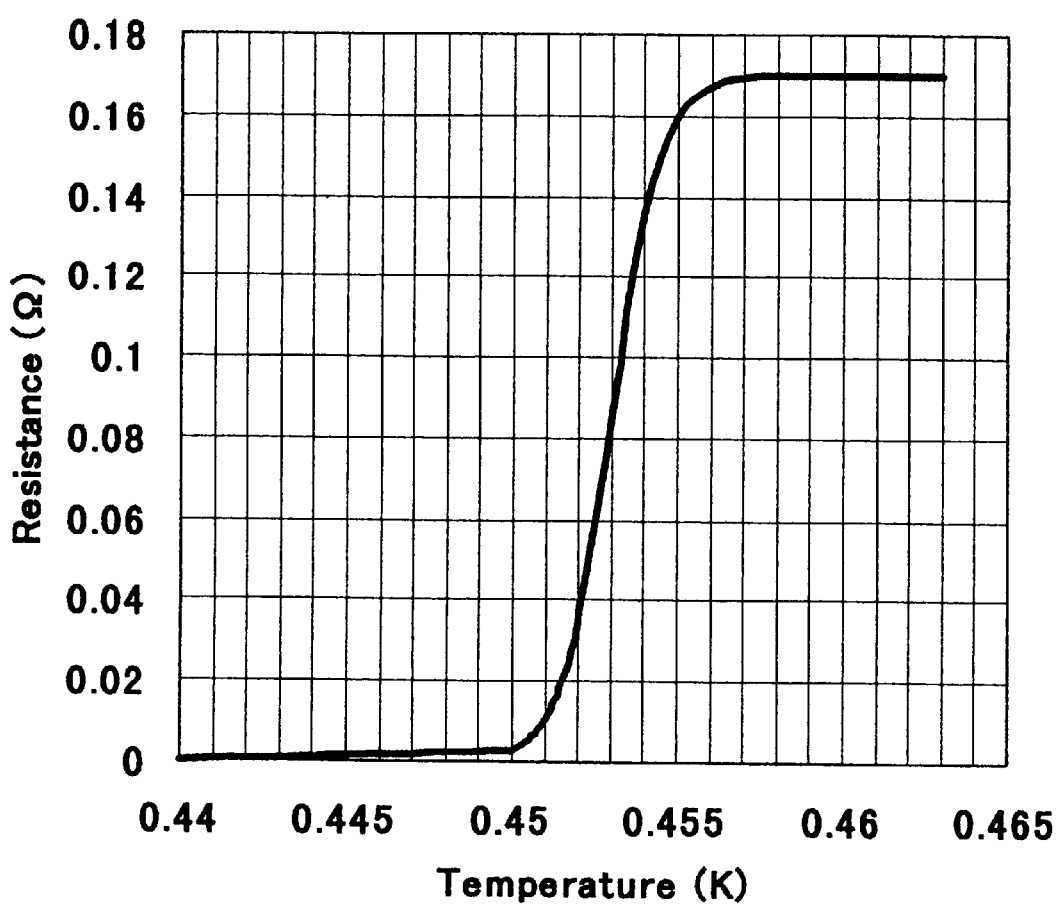
FIG. 5 is a schematic graph showing the resistance-voltage characteristics of a superconductor.

FIG. 4 is a schematic view of another calorimeter using a superconducting transition edge. This calorimeter has an absorber for absorbing radiation and producing heat, the absorber being formed on a resistor whose resistance value is varied by the heat. The resistor is formed on a membrane for controlling the escape of the heat. This calorimeter is fitted with a thermal conductance adjuster for adjusting the thermal conductance of the membrane.

In the present calorimeter, the resistor 52 and superconducting wires 53 are formed on the membrane 51. The absorber 54 is formed on the resistor 52.

Either a monolayer of a superconductor or a bilayer of a superconductor and a normal conductor can be used as the resistor 52. Where the bilayer is used, any arbitrary superconductivity transition temperature can be set by varying the film thickness ratio between the superconductor and the normal conductor. For example, gold and titanium can be used as the normal conductor and superconductor, respectively. A thin titanium film having a thickness of 100 nm has a superconductivity transition temperature of about 0.6 K. The superconductivity transition temperature can be shifted to 0.4 to 0.5 K, for example, by laminating gold to a thickness of tens of nanometers. The superconducting wires 53 can be made from niobium, for example.

During the operation of the calorimeter, Joule heat produced by current flowing through the resistor 52 and heat released to the outside from the resistor 52 through the membrane 51 are maintained in thermal equilibrium. Since the calorimeter is used with in a refrigerator, the calorimeter must be so designed that the amount of heat generated is minimized. In order to reduce the Joule heat produced by the resistor 52, the thermal conductance must be reduced. Means for reducing the thermal conductance is to reduce the cross-sectional area of the membrane 51 or to adopt a method consisting of placing a resistor within the membrane 51, heating it, and adjusting the thermal gradient between the resistor and the outside. During the operation of the calorimeter, the cross-sectional area cannot be varied at will. The method of adjusting the thermal gradient only requires that the temperature produced on the resistor 55 be varied. Therefore, this is adapted as a means for varying the thermal conductance of the membrane 51 during the operation of the calorimeter.

To improve the response speed of the calorimeter, it is better to increase the thermal conductance, because the response speed is equal to the calorimeter's heat capacity divided by the thermal conductance. However, it is necessary to make uniform the thermalization of the calorimeter in order to improve the energy resolution and so it is better to reduce the thermal conductance. The thermal conductance is represented by the product of parameters dependent on the temperature and the shape of the membrane 51, as given by Eq. (11)

$$G = nKT^{n-1}\phi \quad (11)$$

where G is the thermal conductance, n is a parameter dependent on the thermal equilibrium between active electrons within the resistor 52 and the membrane 51, K is a parameter dependent on the shape of the membrane 51, T indicates the temperature, and φ is a parameter indicating the temperature difference between the resistor 52 and the outside. Especially, in order to adjust the thermal conductance, it is necessary to adjust the flow rate of heat from the calorimeter to the outside, i.e., the temperature difference between the resistor 52 and the outside. If a resistor is used as the thermal conductance adjuster, and if the temperature of the membrane is elevated by resistive heating, the temperature gradient between the calorimeter and the outside can be reduced. Consequently, the flow rate of heat from the calorimeter to the outside decreases. If the resistive heating is cut off, the temperature gradient increases, and the flow rate of heat from the calorimeter to the outside increases. It can be seen that the thermal conductance increases as the temperature increases.

When the calorimeter absorbs radiation, it is desired to reduce the thermal conductance. Therefore, the resistor 55 built in the membrane 51 is heated to reduce the temperature difference between the resistor 52 and the outside. After a signal produced as a result of radiation absorption is obtained, heating of the resistor 55 is stopped to increase the thermal conductance. As described thus far, in the present invention, the thermal conductance can be reduced during the process where the calorimeter is thermalized owing to absorption of radiation. The thermal conductance can be increased during the process where active electrons produced as a result of thermalization are quickly released to the outside. Furthermore, variations in the peak values of the calorimeter can be reduced by setting the thermal conductance to a small value at first. In consequence, the energy resolution of the calorimeter can be increased. In addition, the steady state prior to radiation absorption can be regained by quickly releasing electrons produced by thermalization to the outside. Higher-speed response and higher count rate can be accomplished.

As described thus far, the flow rate of heat can be easily controlled by using a resistor as the thermal conductance adjuster. The steady state prior to radiation absorption can be resumed by quickly releasing electrons produced by thermalization. Hence, Higher-speed response and higher count rate can be accomplished.

A calorimeter according to the present invention makes use of a superconducting transition edge and has an absorber for absorbing radiation and producing heat, the absorber being formed on a resistor whose resistance value is varied by the heat. The resistor is formed on a membrane that controls escape of the heat. The calorimeter is characterized in that it is fitted with a device for letting active electrons produced in the calorimeter escape to the outside.

As a result, if the time (C/G) in which heat produced by the absorber is transmitted through the membrane as phonons and allowed to escape is set long to improve the energy resolution, active electrons inside the TES can be forced to the outside of the calorimeter. Therefore, the pulse time constant can be shortened. In consequence, higher-speed operation of the calorimeter can be realized. Furthermore, the time constant (C/G) can be set sufficiently greater than the time in which active electrons produced by the absorber are diffused inside the calorimeter. Hence, variations in the pulse peak values can be suppressed, and higher energy resolution can be accomplished.

The invention also provides a calorimeter characterized in that the device for letting active electrons escape to the outside is an SIN junction device comprising a three-layer structure consisting of parts of the absorber, a thin insulating film, and a superconductor.

Where the absorber is a normal conductor, the three-layer structure consisting of the absorber, thin insulating film, and superconductor is known as an SIN (Superconductor-Insulator-Normal metal) junction. If this structure is used, the response occurring on application of a voltage can be set to 1 $\mu$s. Active electrons produced by the absorber can be quickly sent from the absorber to the superconductor as an electrical current. As a result, a device can be fabricated in which the amount of electric charge flowing from the absorber to the superconductor can be adjusted by applying a voltage between the absorber and the superconductor. A calorimeter capable of providing quick response can be obtained.

In addition, the invention provides a calorimeter which makes use of a superconducting transition edge and in which an absorber for absorbing radiation and producing heat is formed on a resistor whose resistance value is varied by the heat. The resistor is formed on a membrane that controls escape of the heat. This calorimeter is fitted with a thermal conductance adjuster for adjusting the thermal conductance of the membrane.

To improve the response speed of the calorimeter, it is better to increase the thermal conductance, because the response speed is equal to the calorimeter's heat capacity divided by the thermal conductance. However, it is necessary to make uniform the thermalization of the calorimeter in order to improve the energy resolution and so it is better to reduce the thermal conductance. In the present invention, the thermal conductance adjuster is provided which reduces the thermal conductance during the process in which the calorimeter is thermalized owing to absorption of radiation and increases the thermal conductance during the process in which active electrons produced as a result of thermalization are quickly released to the outside. As a consequence, variations in the peak values of the calorimeter can be reduced by reducing the thermal conductance at first. Increase of the energy resolution of the calorimeter can be accomplished. Furthermore, the steady state prior to radiation absorption can be regained by quickly releasing electrons produced by thermalization to the outside. Hence, faster response and higher count rate can be accomplished.

Especially, in order to adjust the thermal conductance, it is necessary to adjust the flow rate of heat from the calorimeter to the outside. Where a resistor is used as the thermal conductance adjuster and the temperature of the membrane is elevated by resistive heating, the temperature gradient between the calorimeter and the ambient can be reduced. For this reason, the flow rate of heat from the calorimeter to the outside decreases. The temperature gradient increases if the resistive heating is stopped. The flow rate of heat from the calorimeter to the outside increases. As a result, if a resistor is employed as the thermal conductance adjuster, the thermal flow rate can be adjusted easily. It is possible to return the apparatus to the steady state prior to radiation absorption by quickly releasing electrons produced by thermalization to the outside. Higher-speed response and higher count rate can be accomplished.

What is claimed is:

1. A calorimeter using a superconducting transition edge, comprising: a membrane for controlling the escape of heat; a resistor provided on the membrane and having a resistance value that varies with heat; an absorber on the resistor for absorbing incident radiation and producing heat; and a heat-dissipating device for letting active electrons produced in the calorimeter escape to the outside and comprising a Superconductor-Insulator-Normal metal (SIN) junction device.

2. A calorimeter using a superconducting transition edge according to claim 1; wherein the SIN junction device has a three-layer structure.

3. A calorimeter using a superconducting edge according to claim 2; wherein the three-layer structure of the SIN junction device comprises a part of the absorber, a thin insulating film, and a superconductor.

4. A calorimeter using a superconducting edge according to claim 2; further comprising a thermal conductance adjuster for adjusting the thermal conductance of the membrane.

5. A calorimeter using a superconducting transition edge according to claim 4; wherein the thermal conductance adjuster comprises a second resistor provided on the membrane spaced apart from the first resistor.

6. A calorimeter using a superconducting transition edge according to claim 5; wherein the thermal conductance adjuster further comprises a heater for heating the second resistor.

7. A calorimeter using a superconducting transition edge according to claim 4; wherein the thermal conductance adjuster reduces the thermal conductance of the membrane during a time in which the calorimeter is thermalized by the absorption of radiation, and increases the thermal conductance of the membrane during a time in which active electrons produced as a result of the thermalization are released by the calorimeter.

8. A calorimeter using a superconducting transition edge, comprising: a membrane for controlling the escape of heat; a first resistor provided on the membrane and having a resistance value that varies with heat; an absorber provided on the first resistor for absorbing incident radiation and producing heat; and a thermal conductance adjuster for adjusting the thermal conductance of the membrane.

9. A calorimeter using a superconducting transition edge according to claim 8; wherein the thermal conductance adjuster comprises a second resistor provided on the membrane spaced apart from the first resistor, and a heater for heating the second resistor.

10. A calorimeter using a superconducting transition edge according to claim 8; wherein the thermal conductance adjuster reduces the thermal conductance of the membrane during a time in which the calorimeter is thermalized by the absorption of radiation, and increases the thermal conductance of the membrane during a time in which active electrons produced as a result of the thermalization are released by the calorimeter.

* * * * *